Sept. 8, 1936.  T. E. WALKER  2,053,410
ATTACHMENT FOR POTATO PLANTING MACHINES
Filed Nov. 15, 1934  4 Sheets-Sheet 1
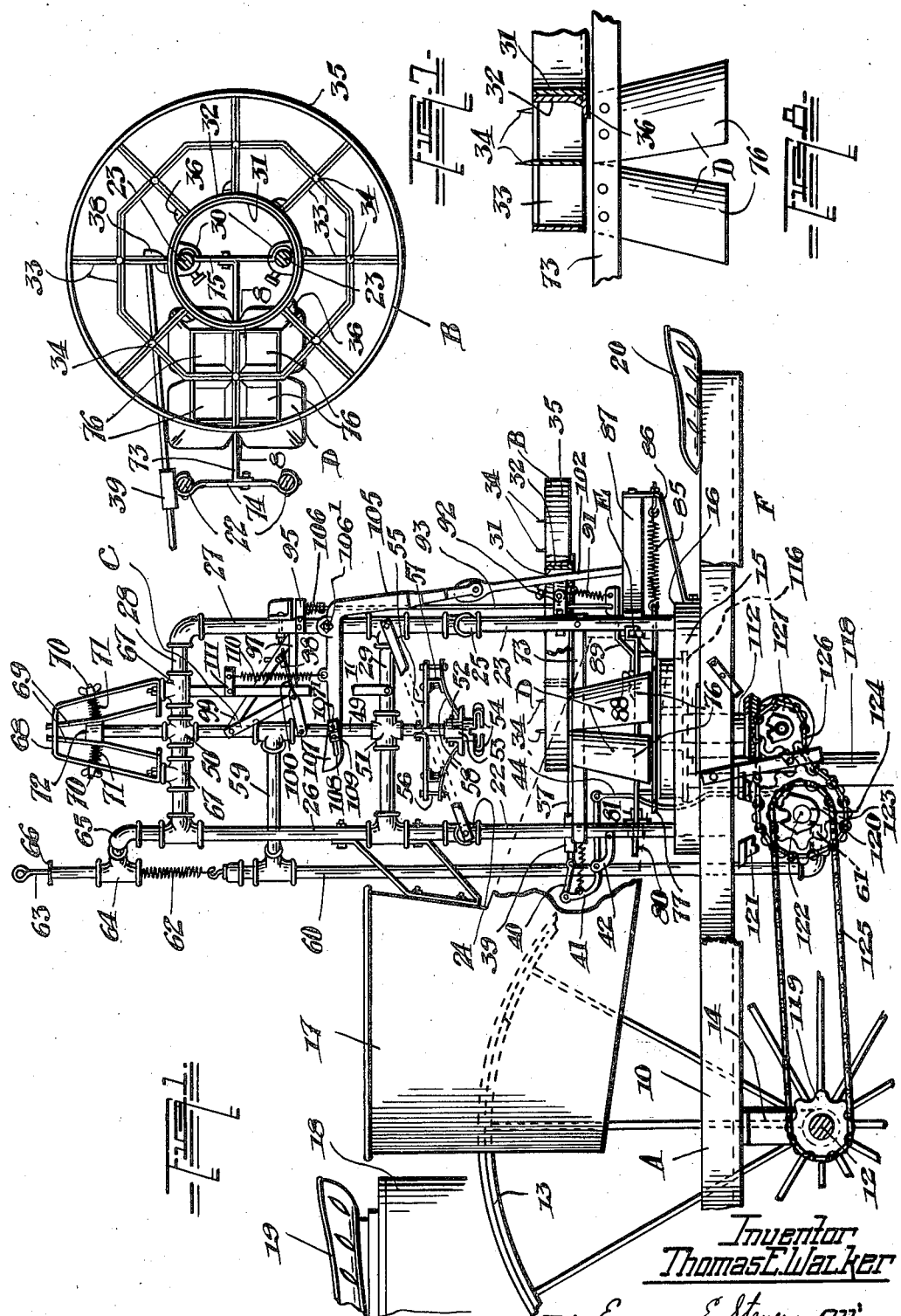
Inventor
Thomas E. Walker
BY Eugene E. Stevens Atty.

Sept. 8, 1936.  T. E. WALKER  2,053,410
ATTACHMENT FOR POTATO PLANTING MACHINES
Filed Nov. 15, 1934  4 Sheets-Sheet 2
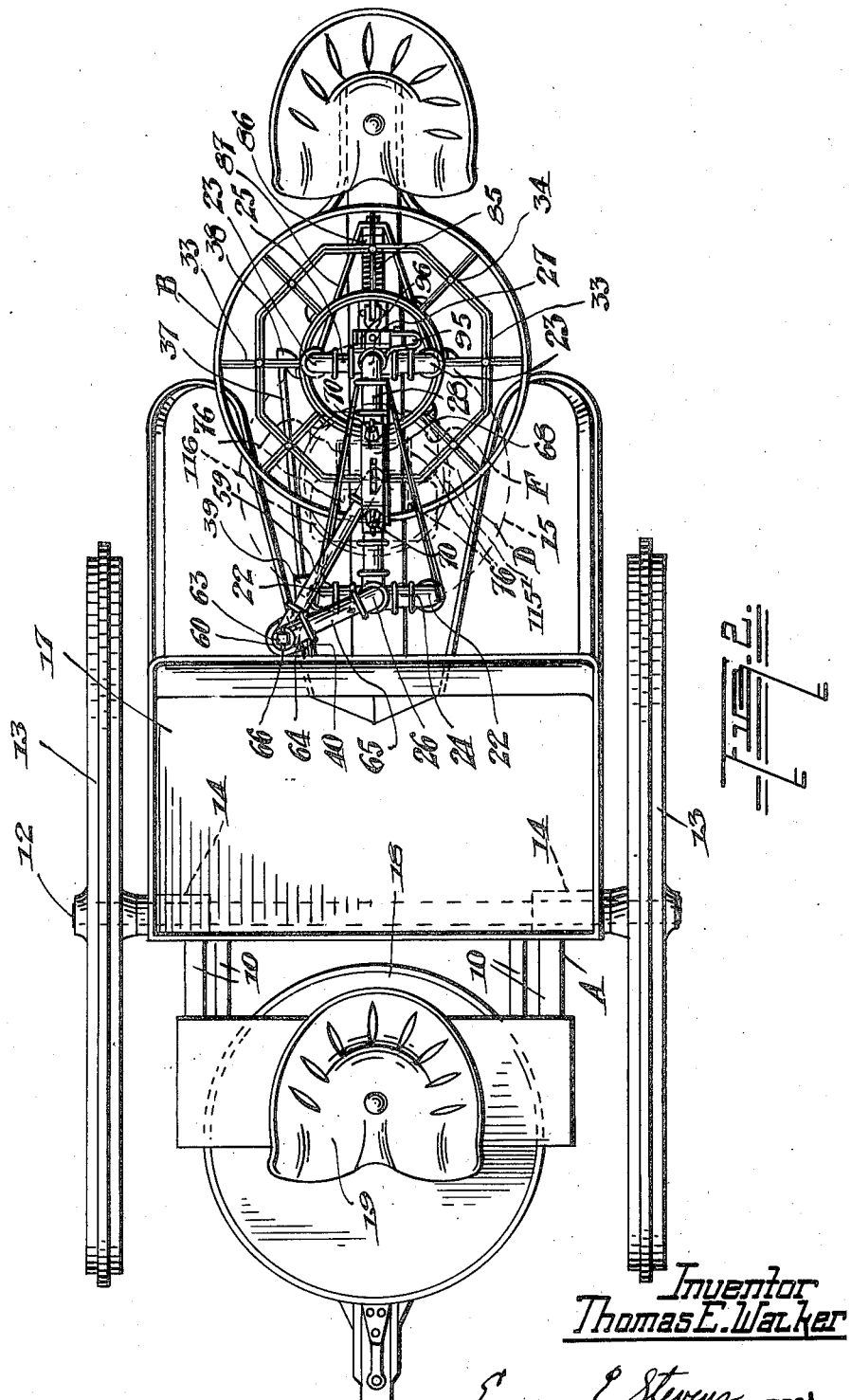
Inventor
Thomas E. Walker
BY Eugene E. Stevens Atty.

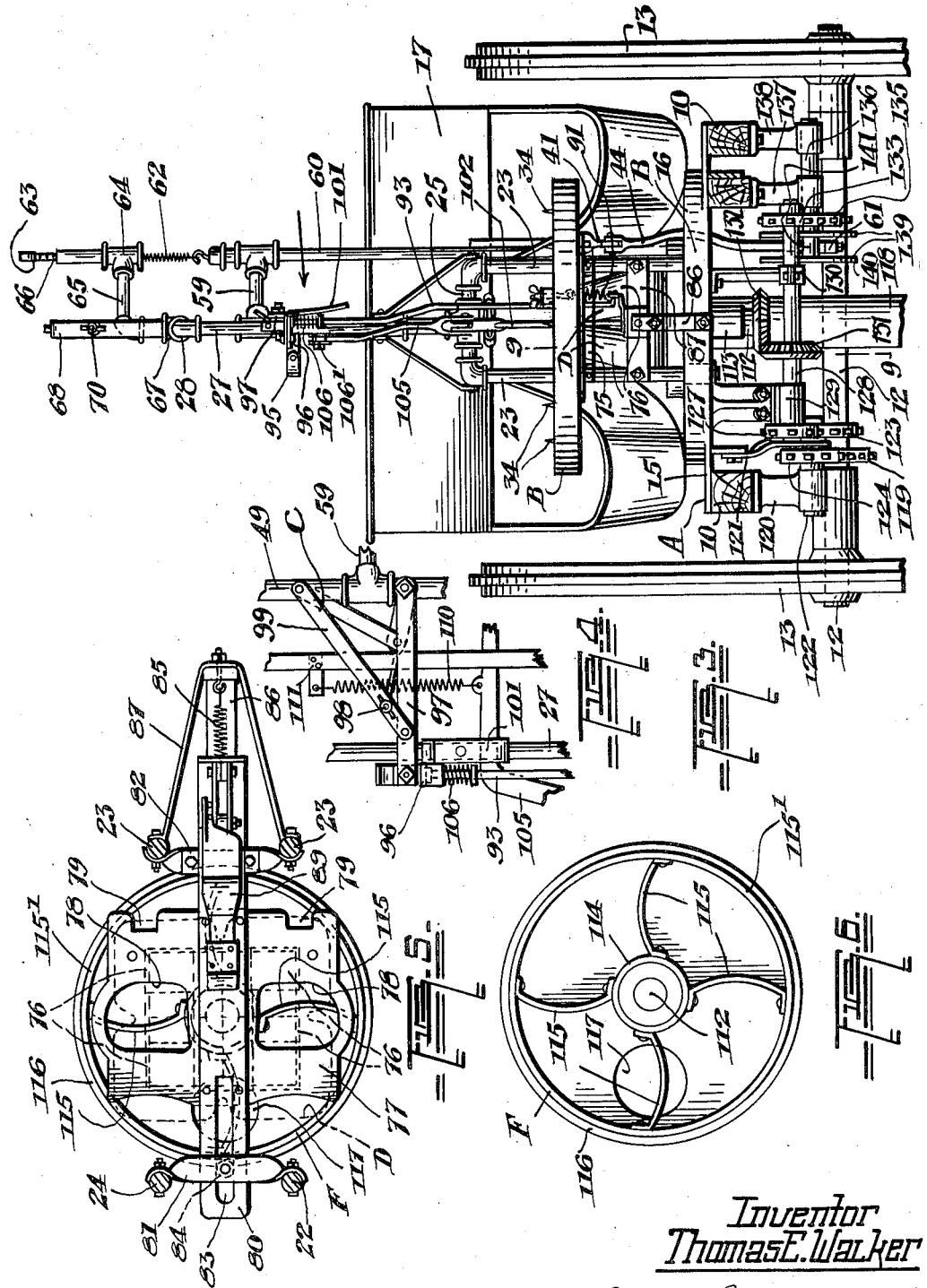

Sept. 8, 1936.　　　　T. E. WALKER　　　　2,053,410
ATTACHMENT FOR POTATO PLANTING MACHINES
Filed Nov. 15, 1934　　　4 Sheets-Sheet 4
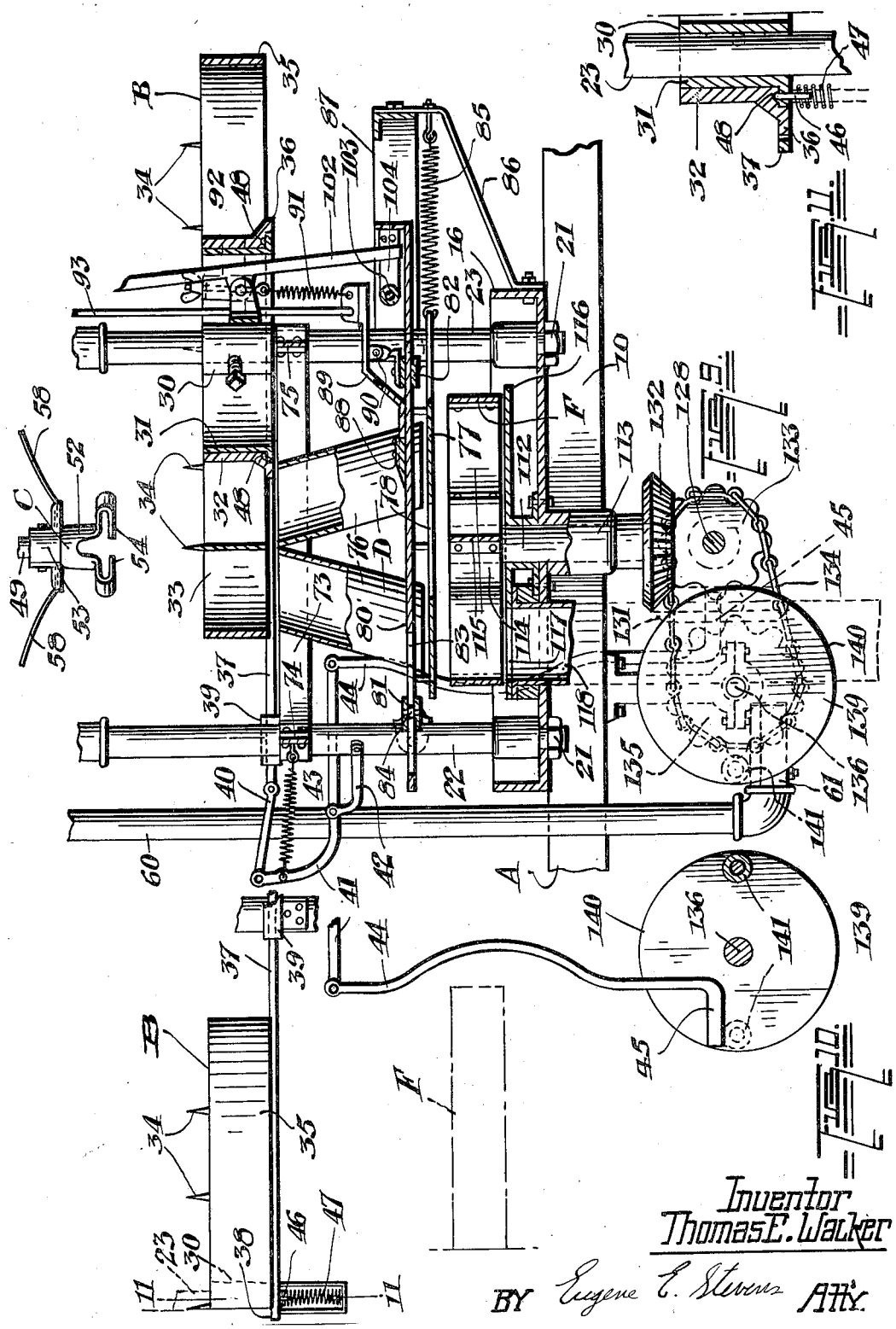
Inventor
Thomas E. Walker
BY Eugene E. Stevens Atty.

Patented Sept. 8, 1936

2,053,410

UNITED STATES PATENT OFFICE 2,053,410

ATTACHMENT FOR POTATO PLANTING MACHINES

Thomas E. Walker, South Tilley, New Brunswick, Canada

Application November 15, 1934, Serial No. 753,195

8 Claims. (Cl. 146—59)

This invention relates to attachments for potato planting machines.

The main object of the invention is to provide an apparatus that will carry out the tuber unit method of planting potatoes by which method the seed pieces of the potatoes are planted in rows, equal spaces separating the seed pieces of each potato and relatively longer spaces separating the seed pieces of successive potatoes from those of the preceding potato.

A further object of the invention is to provide an apparatus which by a minor change in the driving mechanism may be adapted to plant potatoes in the usual manner with equal spaces separating all the seed pieces.

A further object of the invention is to provide an apparatus that will carry out the planting operation entirely mechanically from the time that the potatoes are placed upon the cutting mechanism up to the time that they are delivered to the furrow.

A further object of the invention is to provide an apparatus that with minor changes in structure may be attached to any conventional type of potato planting machine.

A still further object of the invention is to provide a structure which is light and simple in arrangement yet which will carry out the function of planting potatoes automatically with a high degree of accuracy.

With these and other objects in view the invention consists essentially of a bed plate, an auxiliary frame mountable on the main frame of a potato planting machine, the auxiliary frame carrying a rotary cutting apparatus adapted to successively sever a number of whole potatoes into seed pieces; an automatic plunger to force the potatoes down upon the blades of the cutting apparatus, a series of seed chutes to receive the seed pieces gravitating from the cutting apparatus, a sliding valve shutting off the mouths of the seed chutes to retain the seed pieces and to release them at timed intervals into a wheel which regulates the distribution of the seed pieces to the planting drill; suitably located driving connections beneath the main frame of the planting machine adapted to actuate the various units in timed relation.

Referring to the drawings:—

Figure 1 is a side elevation of the complete apparatus mounted on a potato planting machine, the storage hoppers and one of the ground wheels being partially cut away, the remaining ground wheel being removed.

Figure 2 is a plan view of the whole apparatus and of the potato machine upon which it is mounted.

Figure 3 is a rear elevation of the apparatus showing particularly the component parts of the drive mechanism.

Figure 4 is a detailed side elevation of the mechanism for tripping the sliding valve, looking in the direction of the arrow in Figure 3.

Figure 5 is a plan view of the sliding valve, the dotted lines showing the position of the seed chutes above the valve.

Figure 6 is a plan view of the seed distribution wheel showing also the perforated disc through which the seed pieces gravitate to the drill.

Figure 7 is a plan view of the rotary cutting apparatus showing the seed chutes disposed beneath one set of crossed cutting blades.

Figure 8 is an enlarged sectional view on the line 8—8 of Figure 7.

Figure 9 is an enlarged section on the line 9—9 of Figure 3 showing the cutting apparatus, seed chutes, sliding valve, seed distribution wheel and special disc wheel which actuates the plunger and cutting mechanisms.

Figure 10 is a side elevation of the mechanism operating the cutting unit, and

Figure 11 is an enlarged section on the line 11—11 of Figure 10.

Referring to the drawings, A represents the main frame of the potato planting machine made up of beams 10 extending from front to rear and carried on a main axle 12 supported by ground wheels 13, suitable brackets 14 being provided to journal the axle. Mounted upon the beams 10 to the rear of the wheels 13 is a substantially circular bed plate 15 surrounded by an annular upwardly extending flange 16. Also mounted on the frame A is a storage hopper 17, the main portion of which is disposed in front of the planting apparatus, there being rearward extensions to each side of the latter. A fertilizer container 18 is also provided.

A seat 19 located towards the front of the machine is provided for the driver of the horses and another seat 20 disposed towards the rear of the bed plate 15 for the operator of the planting mechanism. Extending upwardly from the front and rear of the bed plate 15 and secured thereto by nuts 21, are pairs of parallel upright posts 22 and 23, each pair spaced apart and linked together at its upper extremity by cross bars 24 and 25 respectively.

From the middle of each of the cross bars 24 and 25, extend uprights 26 and 27, horizontal cross bar 28 being supported by the upper extremities of the latter, an additional horizontal cross bar 29 extending between these uprights at a point slightly above the cross bars 24 and 25.

*Cutting mechanism*

Secured to each of the posts 23 substantially midway between the bed plate 15 and the cross bar 25 are collars 30 carrying a horizontal bearing ring 31 upon which is rotatably mounted the hub 32 of the rotary cutting apparatus B. This apparatus comprises a framework made up of a peripherally disposed series of cutting units or crossed blades 33, each unit having at the point of intersection of the blades, an upright brad 34 adapted to receive the whole potato and to retain it ready for the cutting operation which is performed by the downward movement of the plunger C. This framework is bordered on its outer side by an annular rim 35 which retains the ends of the radial blades 33 in position and gives stability to the whole structure. The complete unit B is adapted to rotate freely by means of the hub 32 mounted on the bearing ring 31.

The hub 32 is provided towards the lower part of its outer periphery with a series of ratchet teeth 36, a tooth opposite each of the units 33. The unit B is rotated by means of a horizontal ratchet arm 37, engaging the teeth 36 with a suitably positioned pall 38. The arm 37 slidable within a bearing 39 attached to one of the posts 22, is connected by a link 40 to a bell crank 41 fulcrumed on a bracket 42 extending outwardly from the post 22 below the bearing 39. The vertical portion of the bell crank 41 is urged inwardly by a spring 43, and receives at the inner end of its horizontal portion an upward thrust by a shaft 44. The shaft 44 extends downwardly to beneath the main frame A and is provided at its lower extremity with a foot 45 adapted to be raised by the upward movement of a roller 141 on the special disc wheel 140, having a driven connection with the main axle, which will be described later in detail.

The upward movement of the shaft 44 causes a substantially horizontal movement of the lever arm 37 thereby causing a pull through the pawl 38 on the teeth 36 and rotating the feeder mechanism B. In this manner each of the units 33 of the feeder mechanism is successively brought beneath the plunger mechanism G and directly above the seed chutes D, being halted in this position by the action of a vertical pin 46 located just beneath the hub 32 and bearing upon its under surface. The pin 46 is urged upwardly by a spring 47 and as the feeder mechanism rotates the pin 46 slides around the under surface of the hub 32 which is provided with a series of shallow depressions 48, one opposite each of the cutting units. Thus, as the pin 46 reaches a depression 48 it will be forced into it by the spring 47 and will thus halt the feeder unit as each cutting unit comes beneath the plunger. The depressions 48 are just sufficiently deep to halt the cutting apparatus when it is rotating freely. When a strong pull of the arm 37 is exerted, however, the pin 46 will be caused to jump out of the depression 48, thus allowing the unit to advance.

*Plunger mechanism*

The plunger mechanism C is made up of a vertically oscillating shaft 49 slidably mounted in bearings 50 and 51 disposed midway between the ends of the cross bars 28 and 29 respectively. On the lower end of the shaft 49 is a plunger foot 52 including a collar 53 slidable vertically to a limited degree on the shaft 49, and downwardly extending fingers 54 adapted upon downward movement of the shaft 49, to force the whole potato resting upon the brad 34 down upon the blades 33 of the cutting unit. Just above the foot 52 are horizontal brackets 55 extending outwardly from the shaft 49. By means of bolts 56 and bearings 57, leaf springs 58 are held pressed downwardly on the collar 53.

As the shaft 49 is depressed and the foot 52 comes into contact with a potato, the first action is a momentary upward movement of the foot 52 upon the shaft 49 against the action of the springs 58. When, however, the potato has been completely severed and the plunger has nearly completed its downward stroke, the springs 58 force the foot 52 down slightly further between the knives 33, thus dislodging any loose portions of potato which may have adhered to the knives after the preliminary downward stroke of the plunger.

Extending outwardly from the shaft 49 is an operating arm 59 connecting the shaft 49 with a vertical rod 60 which extends downwards to beneath the frame A, where it is provided with a foot 61 adapted to be depressed by the movement of the roller 141 on the special disc wheel 140.

The upper end of the rod 60 is attached to a tension spring 62 held by a rod 63 slidable within a housing 64 provided at the outer end of a substantially L-shaped extension 65 of the upright post 26. The rod 63 includes transverse apertures through which a pin 66 may be inserted to bear upon the upper extremity of the housing 64, thus supporting the rod 63 and the spring 62 which urges the rod 60 and the connected rod 49 in an upward direction. Adjustment of the tension on the spring 62 may be accomplished by placing the pin 66 in different apertures in the rod 63.

To lessen the jar occasioned by the rapid upward movement of the shafts 49 and 60, after the foot 61 has been released by the roller 141, a shock absorber mechanism is provided. On the cross bar 28, at each side of the bearing 50, are collars 67 to which are attached the inturned ends of a substantially loop-like upright bracket 68. The inwardly sloping sides of this bracket form a housing for resiliently attached buffers 69 sloping inwardly toward their upper ends and held within the bracket 68 by adjustable bolts 70, against the action of compression springs 71 mounted upon these bolts. On the end of the plunger shaft 49 is a frustro-conical tip 72 which is adapted to slide up between the buffer members 69 against the action of the springs 70. It will thus be seen that the sharp upward movement of the shaft 49, occasioned by the spring 62, will be halted gradually as the tip 72 slides up between the two members 69 and as the pressure upon it increases in consequence.

The operation of the plunger is as follows:— Upon rotation of the wheel 140 down from the main axle, the downward movement of the roller 141 depresses the foot 61 causing a downward movement of the shaft 60 and the connected shaft 49; thus the foot 52 is caused to descend upon a potato resting upon one of the cutting units 33 which, as previously described, has been rotated and brought to rest directly beneath the plunger mechanism. The foot 52 is so shaped that it forces the whole potato resting upon the brad 34 down between the knives 33, consequently severing it into four pieces.

Once the roller has completely rolled over the foot 61, the spring 62 causes a rapid upward movement of the shaft 60 and consequently of the shaft 49. The shock absorber mechanism gradually halts the rapid upward movement of the shaft 49 and lessens any resulting jar.

Seed chutes

Directly beneath the crossed blades 33 of the cutting apparatus B and axially beneath the plunger, are disposed seed chutes D. These chutes are mounted upon a cross bar 73 extending between the posts 22 and 23 and held thereto by brackets 74 and 75 respectively, joining each pair of posts. The apparatus D consists of four chutes 76, their upper ends falling directly beneath and conforming to the size and shape of the units 33. The chutes 76 are adapted to receive the seed pieces from the cutting mechanism as they are severed by the downward movement of the plunger. The chutes spread outwardly towards their lower ends where they are shut off by a horizontally operable valve plate 77 so that when the cut seed gravitates from each respective cutting unit 33, a separate seed piece falls into each of the chutes 76 and is thus conveyed to the plate 77 where it is retained until this plate is opened, as will now be described.

Valve mechanism

The valve plate 77 is substantially square and provided with openings 78, one at each side and at its rear and with slots 79 adapted in the open position to fit against the posts 23. In closed position plate 77 is adapted to shut off the openings at the mouths of the seed chutes 76 and thereby retain the seed pieces gravitating from the cutting mechanism and in open position the openings 78 are adapted to register with two of the seed chutes 76 while the front end of the plate is adapted to clear the remaining seed chutes, thereby leaving their mouths open allowing the seed pieces to fall down into the seed distributing wheel.

The plate 77 is urged rearwardly towards the open position by tension spring 85 attached to its rear end and at the other end to a strut 86 extending upwardly and outwardly from the flange 16. The upper end of the strut 86 is connected to the apex of a substantially V-shaped bracket 87 extending outwardly from the posts 23. The plate 77 is riveted to a horizontal arm 80 slidable in brackets 81 and 82 extending between the posts 22 and 23 respectively. A vertical roller 84 centrally disposed of the bracket 81 is slidable in a slot 83 of the arm 80 to prevent the latter's lateral movement.

The valve plate 77 is held in closed position against the action of the spring 85 by means of a catch 88 on the upper side of the arm 80, this catch being held by one end of a lever-like pawl 89 pivotally mounted at 90. The outer end of the pawl 89 is urged upwardly by a tension spring 91 extending from a bracket 92 on the post 23 and consequently the inner end of the pawl is normally held down and in engagement with the catch 88. Depression of the outer end of the pawl 89 will release the catch 88 allowing plate 77 to be drawn into the open position.

At the outer end of the pawl 89 there is pivotally connected a vertical operating rod 93 extending upwardly adjacent to the post 27. At a point midway between the cross bars 28 and 29 the post 27 carries a bracket 95 to which is hingedly connected a trigger member 96 having a resilient connection with the rod 93 through a spring 106, thus allowing for any excess movement. The trigger member 96 is depressed by the downward movement of an arm 97 extending outwardly from the plunger shaft 49, just below its junction with the arm 59, the arm 97 being horizontally urged towards the trigger member by means of adjustable spring 98 extending between the brackets 99 and 100 also connected to the plunger shaft 49.

Below the trigger member the post 27 is provided with a vertical shoe 101 adapted to force the arm 97 outward from the trigger member against the action of spring 98. It will thus be seen that the downward movement of the plunger shaft 49 causes a depression of the arm 97 and consequently of the trigger member 96, but as soon as arm 97 reaches a certain point it will be forced outwardly by the shoe 101 and will clear the trigger member 96 thus releasing it and depressing the pawl 89.

The valve plate 77, after having been released by disengaging the pawl 89 from the catch 88, is urged to the open position by the spring 85. The valve is subsequently moved into the closed position again by an inner movement of the lower end of a lever 102 working against a roller 103 rotatably mounted within a bracket 104 at the rear end of the arm 80. The lever 102 is fulcrumed on the bracket 92.

The upper end of the lever 102 is pivotally connected to the lower end of a bell-crank 105 fulcrumed on the post 27 on a connection 106'. The other end of the bell-crank 105 is provided with a pivotally connected foot 107 having therein a slot 108 in which is slidable a connection 109 from the plunger shaft 49. Midway between point 106' and the shoe 107 the horizontal portion of the bell-crank 105 is urged upwardly by a tension spring 110 connected at its upper end to a bracket 111 extending downwardly from the collar 67 on the cross bar 28.

The downward movement of the plunger shaft causes the foot 107 to pivot around the connection 107' while the bolt 109 slides along the slot 108 allowing for a certain amount of lost motion before the horizontal arm of bell-crank 105 is depressed. The depression of this horizontal arm causes an arcuate outward movement of its lower end which forces the upper end of the lever 102 in an outward direction and forces its lower end inwardly against the roller 103, thus forcing the valve plate 77 into closed position.

The operation of the valve mechanism is as follows:—Supposing four seed pieces have already been cut and are resting on the valve plate 77; the plunger C commences its downward movement. As the shaft 49 is depressed the trigger 96 is depressed, as has been described and consequently the valve plate 77 is drawn into the open position by spring 85, thus releasing into the distributing wheel, the four seed pieces resting upon it. Meanwhile, the special pivotal connection of the foot 107 on the bell-crank 105 is allowing for lost motion as the bolt 109 slides along the slot 108. As soon as the trigger 96 is released by the action of the shoe 107 the lost motion on the bell-crank is completed and its horizontal arm is depressed, thus causing inward movement of the lower end of the lever 102 and forcing the plate 77 into the closed position ready to receive the seed pieces as they are forced down on the cutting mechanism by the plunger C.

Seed wheel F

Directly beneath the plate 77 is a horizontally rotating distributing wheel F. This wheel is mounted on the shaft 112 journalled in a bearing 113 disposed centrally and extending upwardly from the bed plate 15. The wheel F is made up of a hub 114 secured to the shaft 112 and outwardly extending curved spokes 115 connecting the hub 114 with an annular supporting frame 115'. This arrangement of the hub, spokes and collar, forms four seed pockets having as a base a plate 116 mounted above the bed plate 15, directly beneath the seed wheel F, just allowing sufficient clearance for free rotation of the latter. The plate 116 has a single aperture 117 which is disposed at the head of a chute 118 leading to the planting drill.

It will thus be seen that seed pieces, as they gravitate from the valve plate 77, will come to rest within the pockets of the seed wheel and upon the plate 116. Upon rotation of the seed wheel, however, the spokes 115 will sweep the successive seed pieces into the aperture 117, whence they will gravitate to the planting drill.

The drive

The various units of the machine receive their drive from a sprocket gear 119 carried on the main axle 12 close to one of the brackets 14. In suitable brackets 120 and 121, extending downwardly from the frame A, is journalled a stub shaft 122 carrying a large sprocket gear 123 and also a smaller sprocket gear 124, the latter being aligned with the gear 119, a sprocket chain 125 connecting them.

A chain 126 connects the gear 123 with a smaller gear 127 on a long shaft 128 having bearings rearwardly of and parallel to the stub shaft 122 in suitable brackets 129 and 130.

The shaft 128 carries a centrally disposed bevel gear 131 meshing with a bevel gear 132 at the lower end of the shaft 112 providing the drive for the seed distributing wheel F.

On the opposite end of the shaft 128 to the gear 127 is an identical gear 133 connected by a chain 134 with a sprocket gear 135 on a stub shaft 136 in axial alignment with the shaft 122 and journalled in suitable brackets 137 and 138. The gear 135 corresponds in size with the gear 123.

Inwardly of the gear 135 the shaft 136 carries a specially constructed disc wheel 139 made up of spaced apart circular discs 140 and provided with an eccentrically positioned roller 141 extending between the two discs. This roller is adapted, upon rotation, to alternately raise the foot 45 operating the cutting mechanism and to depress the foot operating the plunger mechanism.

By adjusting the size of gears 133 and 135 the drive is so arranged that the roller 141 makes one complete revolution for each 1¼ revolutions of the shaft 112 and consequently of the seed wheel F. In this manner the seed wheel F rotates five pockets for each descent of the plunger, the feeder mechanism being caused to advance one unit in the same length of time. The valve plate 77, receiving its drive directly from the plunger, is caused to open at the commencement of each descent of the plunger shaft 49 through the operating mechanism already described. As the plunger is depressed further, the valve is closed again just before the cutting operation takes place and the seed pieces gravitate down the seed chute onto the plate 77. In this manner four additional seed pieces are delivered from the valve plate 77 to the seed wheel F when this wheel has successively delivered its preceding four seed pieces to the drill and has advanced one empty pocket.

As the machine is advancing along the ground all the time these operations are taking place, the seed is delivered to the furrow in regular spaced relation until the empty pocket in the wheel is reached, at which point no seed piece is delivered to the drill and, consequently, a space is left between the seed pieces of each potato and those of the succeeding potato. In this manner the tuber unit method of planting is carried out.

To enable this apparatus to plant potatoes in the ordinary manner, that is, with equal spaces between all the seed pieces, it is only necessary to replace the gear 135 by a gear of the same size as the gear 133. In this manner the disc wheel 139, instead of rotating slower will be caused to rotate at the same speed as the shaft 112 and the seed wheel F. The cutting operation will then take place faster and additional seed will be delivered to the seed wheel by the valve mechanism, just as soon as the four preceding seeds have been delivered to the drill and without time for the seed distributing wheel to advance one extra pocket, which it does when carrying out the tuber unit method of planting.

Method of operation

At the commencement of the planting operation, the operator occupying the seat 20 takes whole potatoes from the storage hopper 17 and places them upon the eight brads 34 so that the cutting mechanism is completely loaded. As the driver on the seat 19 causes the machine to advance, the plunger mechanism is caused to descend upon a potato resting above one of the cutting units 33, forcing it down upon the cross knives and causing it to be severed into four seed pieces.

The four seed pieces then gravitate down the chutes 76 onto the closed valve plate 77. The plunger is then quickly raised by the action of the spring 62, the roller 141 having at this point released the foot 61.

After the upward movement of the plunger another potato is brought into position for severing as the feeder mechanism is advanced one unit by the action of the roller 141 upon the foot 45, as has been described in connection with the cutting mechanism.

The plunger is then ready to be depressed once again. As the shaft 49 moves downwardly, it first releases the valve plate 77 which is moved into open position by the spring 85. In this manner the four seed pieces lying upon the plate gravitate into the seed wheel.

The further downward movement of the plunger moves the valve plate 77 into closed position through the lever 102 and is thus ready to receive the next four seed pieces from the cutting mechanism. As the plunger has already started on its downward movement, only a short space elapses between the time the seed is delivered from the valve plate 77 to the seed wheel until the time that four additional seed pieces are resting upon the plate 77. As soon as the four seed pieces have been delivered from the valve plate 77 to the seed wheel F, the latter rotates, the spokes 115 sweeping each successive seed piece through the aperture 117 down the chute 118 into the drill, the mechanism being timed so that the wheel advances one empty pocket before the four additional pieces are released from the valve plate.

The operations as set out above are repeated continuously as long as the operator keeps feeding whole potatoes to the cutting mechanism.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim as my invention is:

1. An attachment for potato planting machines comprising in combination means for cutting into seed pieces a plurality of potatoes, plunger means for forcing a potato down upon said cutting means, a horizontal sliding valve for retaining the seed pieces gravitating from said cutting means, revolving means for distributing the seed pieces to a planting drill, driven means for alternately actuating said plunger and said cutting means, actuating means for said valve operated by the plunger for regulating the supply of seed pieces to said distributing means and means rotating said distributing means in synchronism with the other parts of the attachment.

2. In an attachment for potato planting machines including a rotary cutting apparatus and a plunger, seed conveying chutes beneath said cutting apparatus, a horizontal sliding valve adapted to close the mouths of said chutes, spring means urging said valve into the open position, a latch retaining said valve in the closed position against the action of said spring means, means actuated by the plunger for releasing said latch and means also actuated by the plunger for subsequently closing said valve.

3. An apparatus for planting potatoes with spaces separating the seed pieces of one potato from the seed pieces of the other potatoes comprising a supporting plate having an aperture therein, a seed distributing wheel including pockets and rotatable directly above said plate, a horizontal sliding valve above said wheel, a rotary cutting apparatus including a framework of crossed blades, seed chutes disposed beneath said framework and above said valve, a plunger disposed above said framework, rotary means for alternately advancing the cutting apparatus and depressing the plunger, means associated with said plunger for alternately opening and closing said valve, and additional means for rotating said distributing wheel.

4. An attachment for potato planting machines comprising in combination, a cutting apparatus and a revolving distributing wheel having pockets, a sliding valve regulating the supply of seed pieces from said cutting apparatus to said wheel, means actuating said apparatus valve and wheel whereby at least one blank pocket in said wheel always separates successive supplies of seed from said valve.

5. In a potato planting machine, the combination of a potato cutting apparatus, a horizontal sliding valve beneath said cutting apparatus, said valve adapted when in closed position to receive the seed pieces gravitating from said cutting apparatus, spring means urging said valve towards the open position, a latch retaining said valve in the closed position, means having a positive driven connection with the plunger for releasing said latch, and means also driven by the plunger for subsequently returning said valve into the closed position.

6. An attachment for potato planting machines comprising in combination a rotary potato cutting apparatus and a plunger adapted to force a potato down upon said cutting apparatus, said plunger including a shaft, spring means for urging said shaft in an upward direction, driven means for moving the shaft in a downward direction and a plurality of diagonally disposed resilient members adapted to engage therebetween the upper end of said shaft to gradually decrease its upward movement on its release by said driven members.

7. An attachment for potato planting machines comprising in combination a rotary potato cutting apparatus adapted to receive a number of whole potatoes to be separated into seed pieces, means for rotating said cutting apparatus, a plunger for forcing the seed pieces down upon the blade of the cutting apparatus, common driving means for said plunger and the rotating means for the cutting apparatus, said plunger and the rotating means for said cutting apparatus each having a foot for engagement with said drive, the latter including an eccentrically positioned member adapted to intermittently engage the foot of said cutting apparatus and the foot of the plunger.

8. An attachment for potato planting machines comprising in combination potato cutting means, a plunger having a shaft, a foot slidably mounted on the shaft, resilient means for urging said foot in a downward direction, means for actuating said plunger, said foot having resilient fingers for engagement with a potato carried by the cutting means, upon movement of said plunger, said foot being yieldable against the pressure of said resilient urging means during the cutting of said potato, said resilient urging means actuating said foot downwardly at the completion of the cutting to eject the potato pieces from the cutting means.

THOMAS E. WALKER.